United States Patent
Gaertner et al.

(10) Patent No.: US 11,721,364 B1
(45) Date of Patent: Aug. 8, 2023

(54) ADAPTIVE READ CLEARANCE FOR IMPROVING READER RELIABILITY

(71) Applicant: Seagate Technology LLC, Fremont, CA (US)

(72) Inventors: Mark A. Gaertner, Shakopee, MN (US); Dipeshkumar J. Purani, Shakopee, MN (US); Richard P. Michel, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/693,822

(22) Filed: Mar. 14, 2022

(51) Int. Cl.
*G11B 5/54* (2006.01)
*G11B 21/08* (2006.01)

(52) U.S. Cl.
CPC .................................. *G11B 21/08* (2013.01)

(58) Field of Classification Search
CPC ......... G11B 5/6011; G11B 5/012; G11B 5/02; G11B 5/60; G11B 5/6029; G11B 20/10388; G11B 5/607; G11B 7/126; G11B 7/1263; G11B 2005/0021
USPC .......................................................... 360/75
See application file for complete search history.

(56) References Cited

U.S. PATENT DOCUMENTS

| | | | |
|---|---|---|---|
| 6,972,919 B2 | 12/2005 | Suk | |
| 7,483,234 B2 | 1/2009 | Shimozato | |
| 7,492,543 B2 | 2/2009 | Mitsunaga et al. | |
| 7,508,617 B2 | 3/2009 | Mak et al. | |
| 7,729,080 B2 | 6/2010 | Suzuki | |
| 7,817,371 B2 | 10/2010 | Bolasna et al. | |
| 7,839,595 B1 | 11/2010 | Chue et al. | |
| 8,526,133 B2 | 9/2013 | Xia et al. | |
| 8,537,488 B2 | 9/2013 | Kawamoto et al. | |
| 8,619,383 B1 | 12/2013 | Jung et al. | |
| 8,730,610 B2 | 5/2014 | McFadyen et al. | |
| 8,773,802 B1 | 7/2014 | Anderson et al. | |
| 8,830,618 B2 | 9/2014 | Li et al. | |
| 8,941,942 B2 | 1/2015 | Sato et al. | |

(Continued)

FOREIGN PATENT DOCUMENTS

| | | |
|---|---|---|
| JP | 2009301637 A | 12/2009 |
| JP | 2014106991 A | 6/2014 |

OTHER PUBLICATIONS

Tom Coughlin, "Digital Storage Projections For 2021, Part 1", Retrieved from: https://www.forbes.com/sites/tomcoughlin/2020/12/18/digital-storage-projections-for-2021-part-1/, Dec. 18, 2020.

(Continued)

*Primary Examiner* — Nabil Z Hindi
(74) *Attorney, Agent, or Firm* — Westman, Champlin & Koehler, P.A.

(57) ABSTRACT

A data storage device includes at least one data storage disc having at least one data storage surface, and at least one read head configured to communicate with the at least one data storage surface. The data storage device also includes a controller communicatively coupled to the at least one read head. The controller is configured to determine a fly height for the at least one read head over the at least one data storage surface as a function of a read workload associated with the at least one data storage surface or as a function of an ability to satisfy a read request to the at least one data storage surface on a first read attempt.

16 Claims, 5 Drawing Sheets

(56) References Cited

U.S. PATENT DOCUMENTS

| | | | |
|---|---|---|---|
| 9,484,052 B1 | 11/2016 | Johnson et al. | |
| 9,997,186 B1 * | 6/2018 | Bhargava | G11B 5/6029 |
| 10,283,149 B2 * | 5/2019 | Lamberts | G11B 5/455 |
| 10,311,905 B1 | 6/2019 | Guo et al. | |
| 10,410,662 B1 | 9/2019 | Liu et al. | |
| 10,802,739 B1 | 10/2020 | Weber et al. | |
| 10,847,180 B1 | 11/2020 | Martin | |
| 10,878,844 B1 * | 12/2020 | Tsai | G11B 20/18 |
| 10,969,965 B2 | 4/2021 | Malina et al. | |
| 2009/0310247 A1 | 12/2009 | Suzuki | |
| 2014/0146411 A1 | 5/2014 | Sato et al. | |

OTHER PUBLICATIONS

Anton Shilov, "Seagate's Roadmap: The Path to 120 TB Hard Drives", AnandTech, Retrieved from: https://www.anandtech.com/show/16544/seagates-roadmap-120-tb-hdds, Mar. 10, 2021.

* cited by examiner

ADAPTIVE READ CLEARANCE FOR IMPROVING READER RELIABILITY

SUMMARY

In one embodiment, a data storage device is provided. The data storage device includes at least one data storage disc having at least one data storage surface, and at least one read head configured to communicate with the at least one data storage surface. The data storage device also includes a controller communicatively coupled to the at least one read head. The controller is configured to determine a fly height for the at least one read head over the at least one data storage surface as a function of a read workload associated with the at least one data storage surface or as a function of an ability to satisfy a read request to the at least one data storage surface on a first read attempt.

In another embodiment, a method is provided. The method includes employing at least one read head to communicate with at least one data storage surface of at least one data storage disc in a data storage device. The method also includes determining a fly height for the at least one read head over the at least one data storage surface as a function of a read workload associated with the at least one data storage surface or as a function of an ability to satisfy a read request to the at least one data storage surface on a first read attempt.

In yet another embodiment, a data storage system is provided. The data storage system includes at least one data storage disc mounted on a rotatable spindle. The at least one data storage disc has at least one data storage surface. The data storage system also includes at least one read head configured to fly above the at least one data storage surface when the at least one data storage disc is rotated by the rotatable spindle. The at least one read head is configured to communicate with the at least one data storage surface when flying above the at least one data storage surface. The data storage system also includes a controller communicatively coupled to the at least one read head. The controller is configured to determine a fly height for the at least one read head over the at least one data storage surface as a function of a read workload associated with the at least one data storage surface or as a function of an ability to satisfy a read request to the at least one data storage surface on a first read attempt. The determined fly height is different from a nominal fly height of the at least one head over the at least one data storage surface.

Other features and benefits that characterize disclosed aspects will be apparent upon reading the following detailed description and review of the associated drawings.

DETAILED DESCRIPTION OF ILLUSTRATIVE EMBODIMENTS

In a data storage device such as a hard disc drive (HDD), a controller manages read/write operations by, for example, controlling a head that communicates with a data storage medium (e.g., a data storage disc). The head is supported by, for example, an air bearing slider that carries the head and appropriately positions the head above the rotating disc. The slider typically "flies" above the disc at ultra-low fly heights. The fly height is the gap between the head and the disc.

Current data storage device heads, which may include one or more readers, fly at a very low (e.g., less than 2 nanometers) clearance over media (e.g., magnetic media) to reduce head-media spacing to enable data storage capacity improvement. However, reader reliability is a strong function of the active read clearance. Embodiments of the disclosure increase reader fly height or clearance "smartly", such that the increase in reader fly height does not substantially impact an effective areal density of the data storage device while minimizing performance impact and extending reader longevity. Prior to providing details regarding the different embodiments, a description of an illustrative operating environment is provided below.

Figure 1:
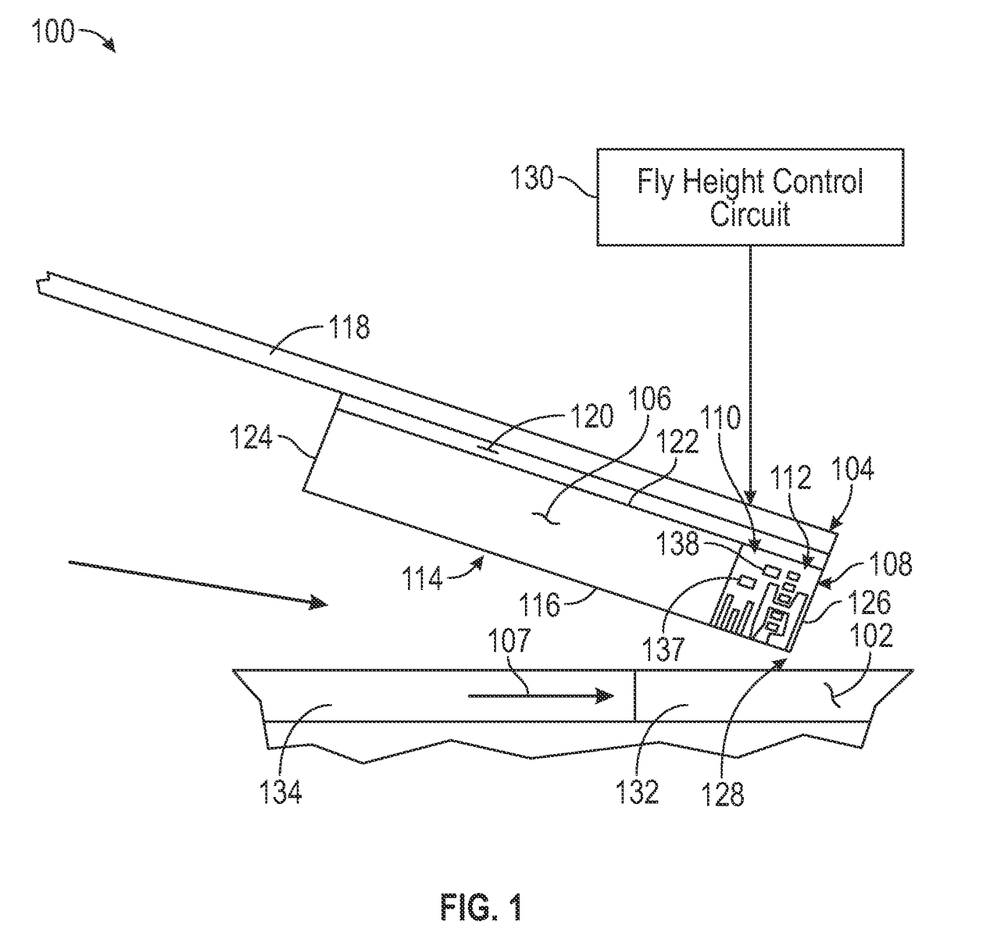
FIG. 1 is a diagrammatic illustration of a portion of a data storage device in accordance with one embodiment.
Figure 2:
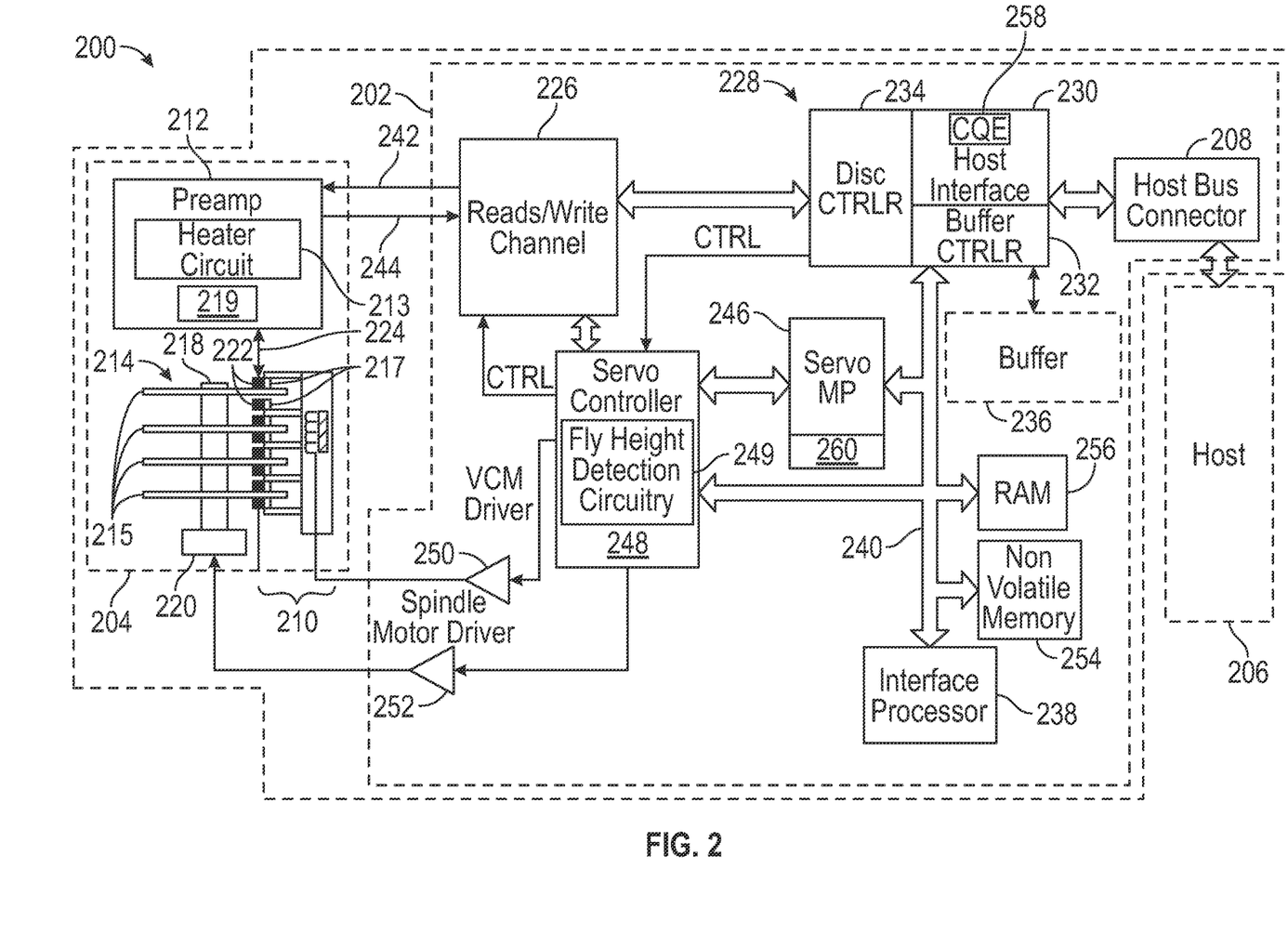
FIG. 2 is a block diagram of a disc drive in accordance with one embodiment.
Figure 3:
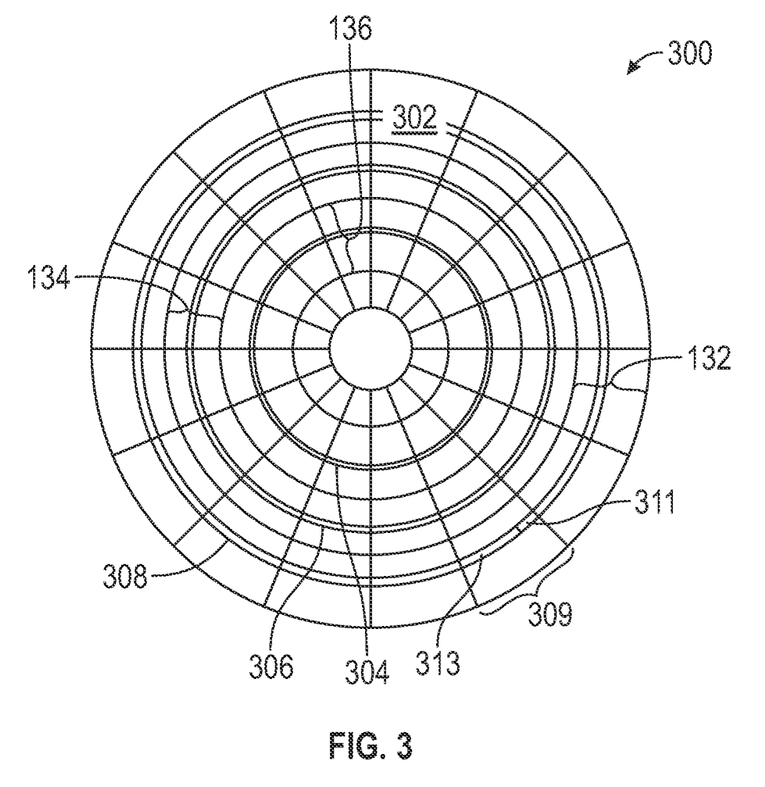
FIG. 3 is a diagrammatic representation of a simplified top view of a first disc included in the disc drive of FIG. 2.

FIGS. 1-3 show an illustrative operating environment in which certain specific embodiments disclosed herein may be incorporated. The operating environment shown in FIGS. 1-3 is for illustration purposes only. Embodiments of the present disclosure are not limited to any particular operating environment such as the operating environment shown in FIG. 1-3. Embodiments of the present disclosure are illustratively practiced within any number of different types of operating environments.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a diagrammatic illustration of a portion of a data storage device 100 that shows a side view of a head 104 above a data storage medium 102. The head 104 includes a transducer portion 108 on a slider 106. The transducer portion 108 shown in FIG. 1 includes a read element 110 and a write element 112. Alternatively, the head 104 may be a head exclusively for reading that includes only the read element 110 and not both elements 110 and 112.

As shown, the head 104 includes a bearing surface (for example, an air bearing surface (ABS)) 114 along a bottom surface 116 of the head or slider facing the medium 102. The head 104 is coupled to a load beam 118 through a gimbal spring 120 coupled to a top surface 122 of the head or slider 106 facing away from the medium 102. The medium 102 can be a continuous storage medium, a discrete track medium, a bit patterned medium or other magnetic storage medium including one or more magnetic recording layers. In certain embodiments, medium 102 may be an optical or other type of data storage medium.

During operation, rotation of the medium or disc 102 creates an air flow in direction 107 as shown in FIG. 1 along the ABS 114 of the slider 106 from a leading edge 124 to a trailing edge 126 of the slider 106 or head 104. Air flow along the ABS 114 creates a pressure profile to support the head 104 and slider 106 above the medium 102 at a fly height 128 for read and write operations. As can be seen in FIG. 1, a fly height or clearance control circuit 130 is employed to control height 128 of the head 104 above the medium 102. Fly height control circuit 130 may be a single circuit or may include multiple sub-circuits. In some embodiments, fly height control circuit 130 may form a portion of disc drive control circuitry (not shown in FIG. 1). Fly height control may be carried out by circuit 130 by controlling heat applied by a read heater 137 and/or a write heater 138 of head 104. Alternate techniques for controlling fly height that do not involve the application of heat may instead be employed in some embodiments. For example, in some embodiments, piezoelectric actuators (not shown) that receive electrical signals from control circuit 130 may be employed to control fly height.

In some embodiments, data storage medium or disc 102 may be divided into multiple zones between a disc inner diameter (ID) (not shown n FIG. 1) and a disc outer diameter (OD) (not shown in FIG. 1) with the multiple read/write zones including, for example, a system data zone 132, which may store device information, and at least one user data zone 134. In general, control circuit 130 may control fly heights of multiple heads such as 104 that communicate with one or more data storage media or discs 102, with one or more surfaces of each disc 102 that may include a plurality of zones such as 132 and 134.

As noted earlier, reader reliability is a strong function of the active read clearance. Current data storage devices, such as HDDs, with high workloads are challenged with reader reliability. Current drive programs set reader clearance or fly height in the drive during manufacture, and the clearance may be set the same across all the read/write zones from the ID to the OD. There is no consideration of increased workload stress in certain zones.

To address the above problems, in embodiments of the disclosure, control circuit 130 is configured to employ higher clearance or fly height for zones or, in general, for data storage surfaces which are stressed with higher workloads. It should be noted that the fly height may be increased for portions of a data storage surface or an entire data storage surface, and there is not necessarily any coupling with recording zones. Additionally, or alternatively, control circuit 130 is configured to modify read clearance or fly height based on predicted health and/or recoverability of sectors to be read in response to a received read command. Details regarding a data storage system that employs fly height control in accordance with embodiments of the disclosure are provided below. Thereafter, details regarding different fly height control embodiments are provided.

Referring now to FIG. 2, a disc drive data storage system (e.g., HDD) 200 in which fly height may be controlled in accordance with example embodiments is shown. System 200 includes a printed circuit board assembly (PCBA) 202 and a head-disc assembly (HDA) 204. PCBA 202 includes circuitry and processors, which provide a target interface controller (or drive controller) for communicating between a host system 206 and HDA 204. Host system 206 can include a microprocessor-based data processing system such as a personal computer or other system capable of performing a sequence of logical operations. Data is transmitted between host system 206 and PCBA 202 via a host bus connector 208. HDA 204 includes an actuator assembly 210, a preamplifier 212, and a disc assembly 214. Disc assembly 214 includes one or more media discs 215, stacked on a spindle assembly 218. Spindle assembly 218 is mechanically coupled to a spindle motor 220 for rotating the disc(s) at a high rate of speed.

Actuator assembly 210 includes a voice coil motor, and multiple actuator arms. Located at the end of each actuator arm are one or more sliders/transducer heads such as 222, which are associated with a respective disc surface. Transducer heads 222 communicate with PCBA 202 via a cable assembly 224 connected to preamplifier 212 for reading and writing data to the transducer head's associated disc surface. Preamplifier 212 provides an amplified signal to a read/write channel 226 of PCBA 202. Read/write channel 226 performs encoding and decoding of data written to and read from the disc.

A servo processor 246 provides intelligent control of actuator assembly 210 and spindle motor 220 through a servo controller 248. By commands issued to servo controller 248 by servo processor 246, VCM driver 250 is coupled to move actuator assembly 210 and spindle motor driver 252 is coupled to maintain a constant spin rate of spindle motor 220.

PCBA 202 includes a host interface disc controller (HIDC) application-specific integrated circuit (ASIC) 228. ASIC 228 includes a host interface 230, a buffer controller 232, and a disc controller 234. Host interface 230 communicates with host system 206 via host bus connector 208 by receiving commands and data from and transmitting status and data back to host system 206. A command queuing engine (CQE) 258 is incorporated in host interface 230.

Buffer controller 232 controls a non-volatile buffer memory 236. Disc controller 234 tracks the timing of data sectors passing under a currently selected transducer head and accordingly sends data to and receives data from read/write channel 226. Disc controller 234 also provides for error correction and error detection on data transmitted to and read from discs 215.

An interface processor 238 manages a queue of commands received from host 206 with the assistance of the CQE 258 embedded in host interface 230. Interface processor 238 interfaces with functional elements of PCBA 202 over a bus 240, for transfer of commands, data, and status.

Disc system operational programs may be stored in non-volatile program storage memory 254, such as read-only memory (ROM) or flash memory, and are loaded into random access memory (RAM) or program loading memory 256 for execution by interface processor 238. Suitably, servo processor 246 may have integrated or separate memory 260 for storage of servo programs.

As mentioned above, preamplifier 212 provides an amplified signal to a read/write channel 226 of PCBA 202. Further, preamplifier 212 may include fly height control circuitry and associated head-heating circuitry 213. In accordance with some embodiments, head heating circuitry 213 can provide an alternating current (AC) injection signal to heaters 217 in the sliders/heads 222. Applying an AC injection signal with the help of head heating circuitry 213 may involve utilizing fly height control values (e.g., digital to analog converter (DAC) values) in a register 219 included in, or coupled to, the head heating circuitry 213. Register 219 may include a table that contains identifiers for different discs 215 and/or zones on discs 215 and corresponding different heater DAC values. The DAC values may be for nominal disc fly height values that are independent of disc workload or sector condition. In accordance with embodiments of the disclosure, head heating circuitry 213 may employ modified versions of the stored DAC values, with modified DAC values taking into consideration disc surface/zone workload and/or sector condition. As noted earlier, alternate techniques for controlling fly height that do not involve the application of heat (e.g., piezoelectric actuators) may instead be employed in some embodiments.

FIG. 3 is a diagrammatic representation of a simplified top view of a disc 300 having a surface 302 which includes multiple zones according to one example. Disc 300 can be, for example, a single disc of disc pack 214 of FIG. 2. As illustrated in FIG. 3, disc 300 includes a plurality of concentric tracks 304, 306 and 308 for storing data on the disc's surface 302. Track 304 is in a first zone 136, track 306 is in a second zone 134, and track 308 is in a third zone 132. Although FIG. 3 only shows a small number of tracks (e.g., 3) for ease of illustration, it should be appreciated that typically many thousands of tracks are included on the surface 302 of disc 300.

Each track 304, 306 and 308 is divided into a plurality of sectors 309. Each sector 309 is typically divided into a servo portion 311 and a data storage portion 313. The servo portions 311 include servo marks that are read by a read transducer of transducer head 222 (of FIG. 2). Preamplifier 212 (of FIG. 2) conditions the analog signal received from the read transducer. Read/write channel 226 (of FIG. 2) receives the conditioned signal and decodes digital servo data from the signal. Part of the conditioning performed by the preamplifier involves amplifying the analog signal to a predetermined level by a variable gain amplifier (VGA), which facilitates accurate decoding of the data via the decoder. The amount of gain provided by the servo VGA is inversely proportional to the signal strength of the read transducer. Also, the signal strength is inversely proportional to the fly height. Thus, fly height may be detected from the servo VGA by, for example, fly height detection circuitry 249 (shown in FIG. 2). It should be noted that, although fly height detection circuitry 249 is shown as being a part of servo controller 248, circuitry 249 may be located elsewhere in the disc drive 200 (e.g., within preamplifier 212). Data VGA from reading user data storage portion 313 or bit error rate (BER) may be used, instead of servo VGA, to determine fly height in alternate embodiments. Different approaches for setting/altering fly height in accordance with embodiments of the disclosure are described below in connection with FIGS. 4A-6.

Figure 4A:
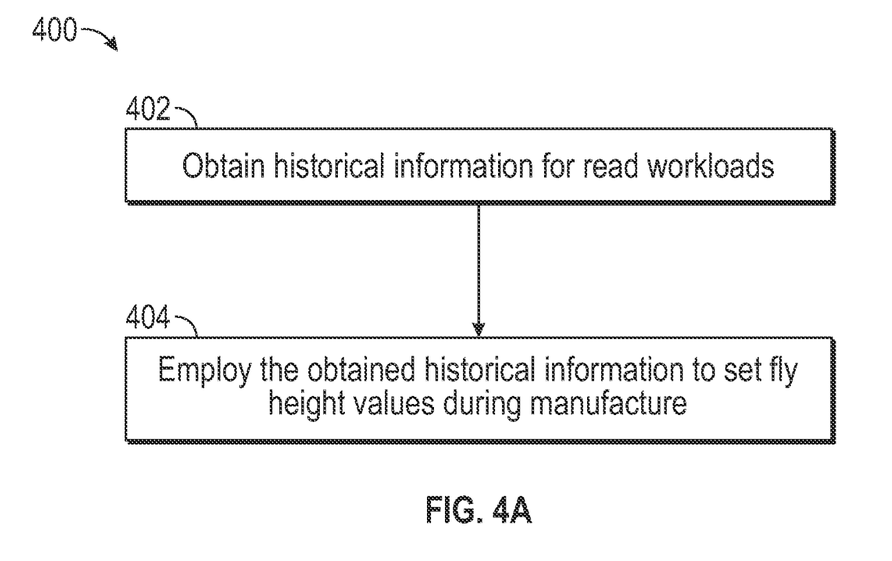
FIG. 4A is a flow diagram of a first method embodiment.

FIG. 4A is a flow diagram of a method 400 of setting fly height or read clearance in accordance with a first approach, which may be referred to as a static adaptive read clearance approach. In this approach, at 402, historical information for read workloads in the field is obtained. At 404, the obtained historical information is employed to set fly height values during manufacture. For example, during manufacture of HDD 200 (of FIG. 2), one or more DAC values may be determined based on the historical information/knowledge for read workloads in the field, and stored in register 219 (of FIG. 2) for use by head heating circuitry 213 (of FIG. 2) to adjust the fly height of the read head during operation of the HDD. Reader clearance or fly height may be set higher in zones (e.g., OD zones) where a significant amount of time carrying out read operations is spent. In order to compensate the impact of the higher clearance in certain OD zones, for example, the clearance in zones where the workload is expected to be much lower may be decreased, thereby yielding effectively a same areal density for the drive, but helping the reliability by setting the clearance higher in zones where significant amount of time is spent reading. As indicated above, in general, the fly height may be increased for portions (e.g., logical block address (LBA) regions) of a data storage surface or an entire data storage surface, and there is not necessarily any coupling with recording zones.

Figure 4B:
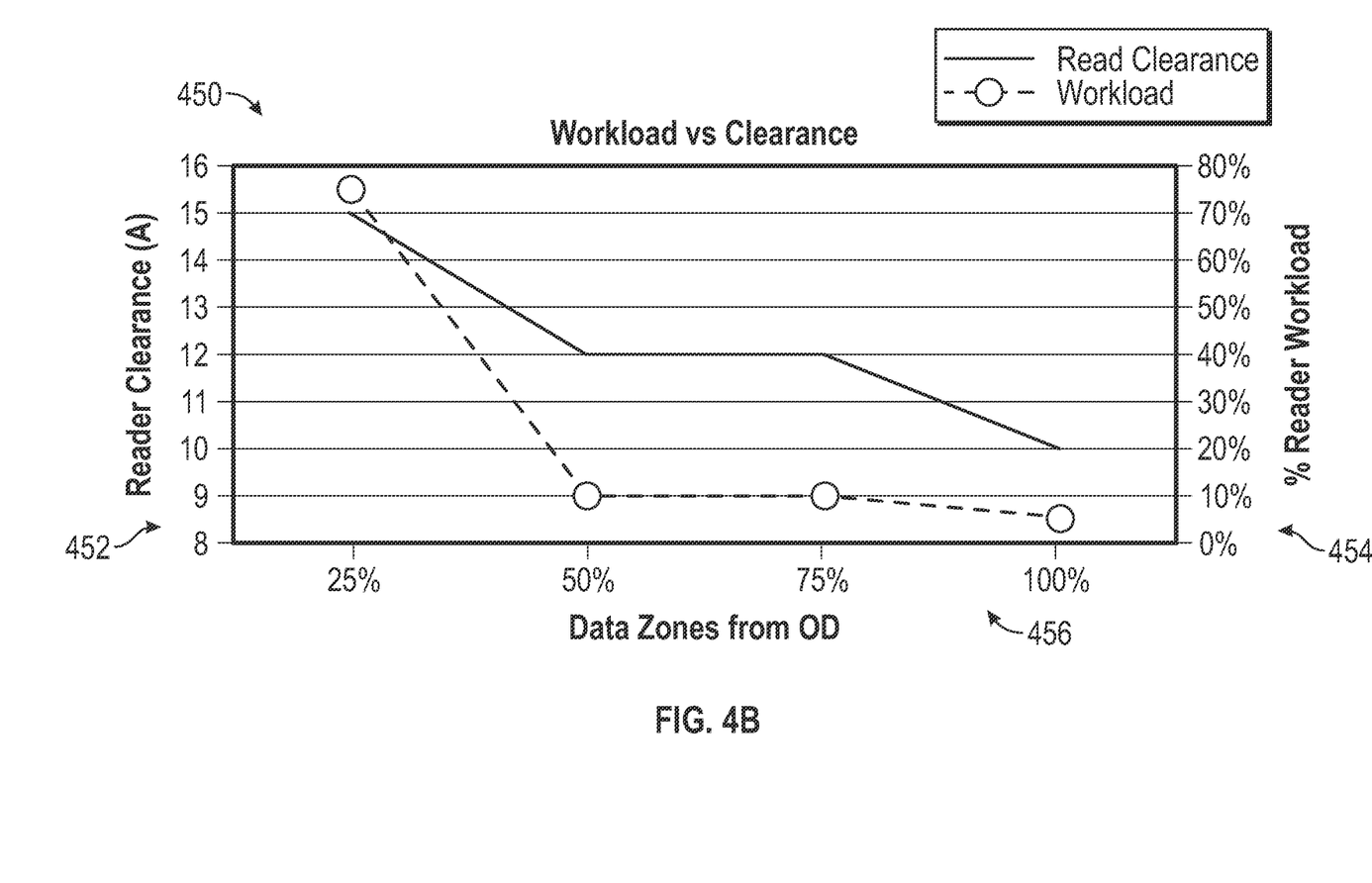
FIG. 4B illustrates a graph showing data storage surface workload values versus head clearance or fly height values.

FIG. 4B is a workload versus clearance graph 450 showing higher read clearances for higher workload zones for the approach described in FIG. 4A. In FIG. 4B, a left-side vertical axis 452 represents read clearance or fly height in angstroms (A), a right-side vertical axis 454 represents percentage (%) of reader workloads, and a horizontal axis 456 represents a percent distance of data zones from the OD. As can be seen in FIG. 4B, zones near the OD have higher workloads and employ higher read clearance than zones away from the OD, which have relatively low workloads.

Figure 5:
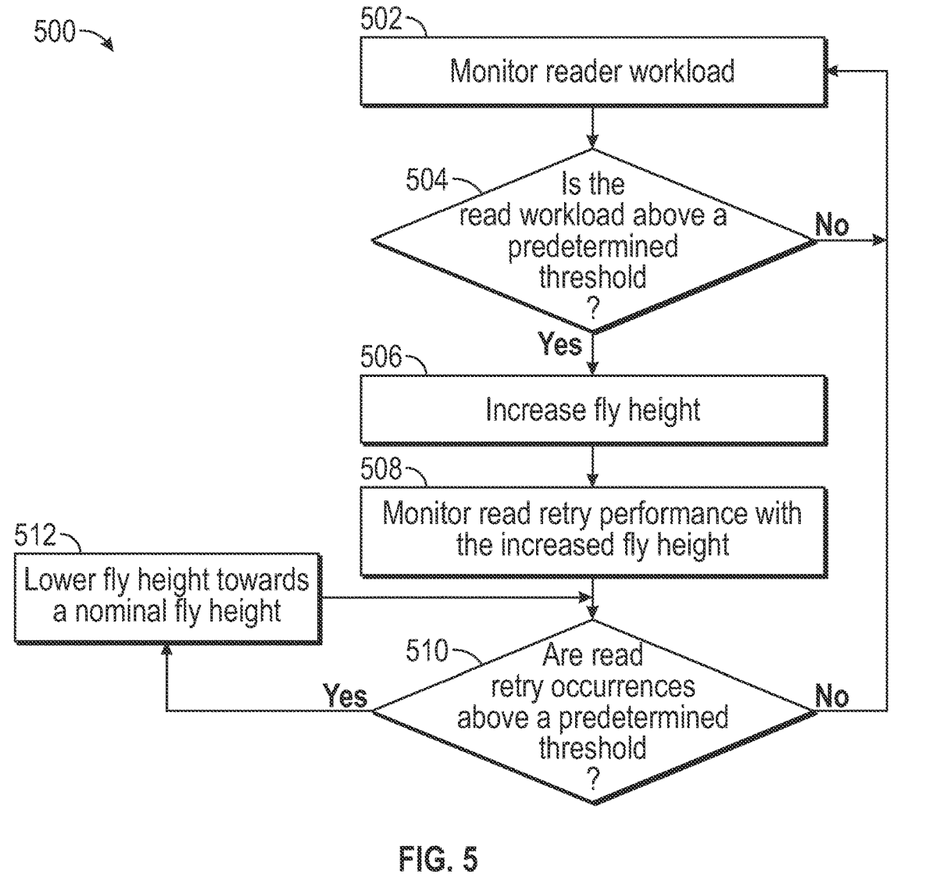
FIG. 5 is a flow diagram of a second method embodiment.

FIG. 5 is a flow diagram of a method 500 of altering fly height or read clearance in accordance with a second approach, which involves altering read clearance in the field based on workload changes in a data storage drive. At 502, reader (e.g., 222 of FIG. 2) workload is monitored by drive firmware or electronics (e.g., by disc controller 234 of FIG. 2). Reader workload monitoring may be carried out globally, by head, by track, and/or by sector/LBA. At 504, the drive detects whether the read workload may compromise drive reliability (e.g., the drive determines whether the read workload is above a predetermined workload threshold). Global terabytes (TB s)/read or TB s/read/head or TB s/read/head/time are examples of possible metrics to detect a demanding read workload. If the answer at 504 is no, control returns to 502. In the answer at 504 is yes, the drive increases the reader clearance at 506. At 508, read retry performance with the increased fly height is monitored (e.g., by disc controller 234 of FIG. 2). At 510, the drive detects whether read retry occurrences with the increased read clearance are above a predetermined threshold. If the answer at 510 is no, control returns to 502. In the answer at 510 is yes, the drive lowers the reader clearance (e.g., towards a nominal fly height) at 512 and control returns to 510. Fly height values may be gradually decremented in steps, and therefore performance of 510 and 512 may be repeated until the answer at 510 is no. This approach is more flexible and improves read head reliability without sacrificing the drive performance.

Figure 6:
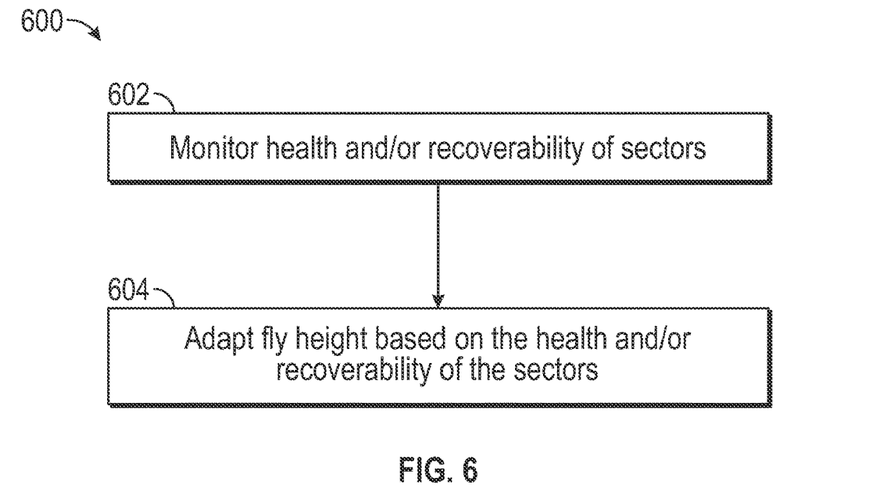
FIG. 6 is a flow diagram of a third method embodiment.

FIG. 6 is a flow diagram of a method 600 of altering fly height or read clearance in accordance with a third approach, which involves altering read clearance based on sector health. In this approach, at 602, health and/or readability/recoverability of sectors are monitored by the drive (e.g., by disc controller 234 of FIG. 2). The monitoring of the health and/readability of sectors may take place in a variety of ways. Sector health may be ascertained from knowledge associated with adjacent track interference (ATI)/side track erasure (STE), which indicate degradation due to adjacent and proximal writes. Sector health may also be indicated by write quality information, such as position error signal (PES) information and/or fly height information. Another indication of sector health may be statistics on read recovery per head, track and/or sector/LBA ranges. The ability to recover read data on-the-fly may be indicated by valid parity, level of parity or other factors. At 604, read clearance or fly height is adapted based on the health and/or reliability of the sectors. The fly height may be adapted based on a predicted health and/or recoverability of sectors to be read in response to receiving a read command in the drive, and before a first attempt to read the sectors associated with the command is made. This approach would keep the read retry rate low, but improve the average read clearance, thus improving reader reliability.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
    at least one data storage disc having at least one data storage surface that comprises an inner diameter (ID) and an outer diameter (OD) with a plurality of logical address block (LBA) regions between the ID and the OD;
    at least one read head configured to communicate with the at least one data storage surface; and
    a controller communicatively coupled to the at least one read head, the controller configured to determine different fly heights for the at least one read head over the different LBA regions of the plurality of LBA regions according to different read workloads associated with the different LBA regions of the plurality of LBA regions.

2. The data storage device of claim 1 and wherein individual fly heights of the different fly heights are selected based at least in part on an effective areal density of the data storage device.

3. The data storage device of claim 1 and wherein the different fly heights are determined during manufacture of the data storage device based on historical knowledge of workloads in the field.

4. The data storage device of claim 1 and wherein the different fly heights are determined by real-time monitoring of the different read workloads.

5. The data storage device of claim 4 wherein the controller is further configured to:
    employ a first fly height of the determined different fly heights for the at least one read head over a first LBA region of the plurality of LBA regions;
    monitor a read retry performance when the determined first fly height is employed; and
    lower the first fly height when read retry occurrences are above a predetermined threshold.

6. A method comprising:
    employing at least one read head to communicate with at least one data storage surface of at least one data storage disc in a data storage device;
    providing the at least one data storage surface with an inner diameter (ID) and an outer diameter (OD) with a plurality of logical block address (LBA) regions between the ID and the OD; and
    determining different fly heights for the at least one read head over the different LBA regions of the plurality of LBA regions according to different read workloads associated with the different LBA regions of the plurality of LBA regions.

7. The method of claim 6 and wherein individual fly heights of the different fly heights are selected based at least in part on an effective areal density of the data storage device.

8. The method of claim 6 wherein the different fly heights are determined during manufacture of the data storage device based on historical knowledge of workloads in the field.

9. The method of claim 6 wherein the different fly heights are determined by real-time monitoring of the different read workloads.

10. The method of claim 9 and further comprising:
    employing a first fly height of the determined different fly heights for the at least one read head over a first LBA region of the plurality of LBA regions;
    monitoring a read retry performance when the determined first fly height is employed; and lowering the first fly height when read retry occurrences are above a predetermined threshold.

11. A data storage system comprising:
   at least one data storage disc mounted on a rotatable spindle, the at least one data storage disc having at least one data storage surface;
   at least one read head configured to fly above the at least one data storage surface when the at least one data storage disc is rotated by the rotatable spindle, wherein the at least one read head is configured to communicate with the at least one data storage surface when flying above the at least one data storage surface; and
   a controller communicatively coupled to the at least one read head, the controller configured to determine a fly height for the at least one read head over the at least one data storage surface as a function of a read workload associated with the at least one data storage surface or as a function of an ability to satisfy a read request to the at least one data storage surface on a first read attempt, wherein the determined fly height is different from a nominal fly height of the at least one read head over the at least one data storage surface.

12. The data storage system of claim 1 and wherein:
   the at least one data storage surface comprises an inner diameter (ID) and an outer diameter (OD) with a plurality of logical block address (LBA) regions between the ID and the OD; and
   the controller is configured to employ different fly heights for the at least one read head over the different LBA regions of the plurality of LBA regions according to read workload differences among the different LBA regions of the plurality of LBA regions.

13. The data storage system of claim 12 and wherein individual fly heights of the different fly heights are selected based at least in part on an effective areal density of the data storage device.

14. The data storage system of claim 11 and wherein the ability to satisfy the read request is determined based on a predicted health and recoverability sectors on the at least one data storage surface to be read to satisfy the read request.

15. The data storage system of claim 11 and wherein the fly height is determined during manufacture of the data storage device based on historical knowledge of workloads in the field.

16. The data storage system of claim 11 wherein the fly height is determined by real-time monitoring of the read workload.

* * * * *